(12) United States Patent
Solar et al.

(10) Patent No.: US 12,565,398 B2
(45) Date of Patent: Mar. 3, 2026

(54) FISH TAPE DISPENSER WITH AUTOMATIC LENGTH DETERMINATION

(71) Applicant: IDEAL Industries, Inc., Sycamore, IL (US)

(72) Inventors: Brenton Solar, Genoa, IL (US); Tim Tunnell, Sycamore, IL (US); Brendan Metz, St. Charles, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 211 days.

(21) Appl. No.: 18/308,325

(22) Filed: Apr. 27, 2023

(65) Prior Publication Data

US 2024/0359945 A1 Oct. 31, 2024

(51) Int. Cl.
*B65H 75/36* (2006.01)
*H02G 1/08* (2006.01)

(52) U.S. Cl.
CPC ....... *B65H 75/364* (2013.01); *B65H 2220/02* (2013.01); *B65H 2553/51* (2013.01); *B65H 2701/376* (2013.01); *H02G 1/083* (2013.01)

(58) Field of Classification Search
CPC ................ B65H 75/364; B65H 75/406; B65H 2220/02; B65H 2553/51; B65H 2701/376; H02G 1/083
See application file for complete search history.

(56) References Cited

U.S. PATENT DOCUMENTS

| | | | |
|---|---|---|---|
| 3,424,435 A | 1/1969 | Juergen | |
| 4,092,780 A | 6/1978 | Trethewey | |
| 5,427,323 A | 6/1995 | Kaneko | |
| 6,722,603 B1 | 4/2004 | Atencio | |
| 9,417,054 B2 | 8/2016 | Moffatt | |
| 2007/0036506 A1* | 2/2007 | Kewitsch ............. | G02B 6/4457 |
| | | | 385/135 |
| 2011/0315802 A1 | 12/2011 | Kuriyama | |
| 2019/0292005 A1* | 9/2019 | Miller .................. | B65H 75/406 |

FOREIGN PATENT DOCUMENTS

| | | | |
|---|---|---|---|
| WO | 1998002037 A1 | 1/1998 | |
| WO | WO-9802037 A1 * | 1/1998 ........... | A01K 87/007 |

OTHER PUBLICATIONS

International Search Report and Written Opinion of international application No. PCT/US24/21059, dated Jul. 9, 2024, 12 pp.
Office Action from Taiwan application No. 113114284, dated Feb. 12, 2025, 39 pp.

* cited by examiner

*Primary Examiner* — Seahee Hong
(74) *Attorney, Agent, or Firm* — Greenberg Traurig, LLP

(57) ABSTRACT

A device includes a spool; a fish tape wound on the spool; a magnet coupled to the spool; a sensor configured to detect the magnet and to generate a signal indicative of the detection; and a controller in communication with the sensor and configured to determine an extension of the fish tape based on the signal; and output the determined amount.

12 Claims, 13 Drawing Sheets

FISH TAPE DISPENSER WITH AUTOMATIC LENGTH DETERMINATION

TECHNICAL FIELD

This disclosure generally relates to fish tape dispensers.

DETAILED DESCRIPTION

Figure 1:
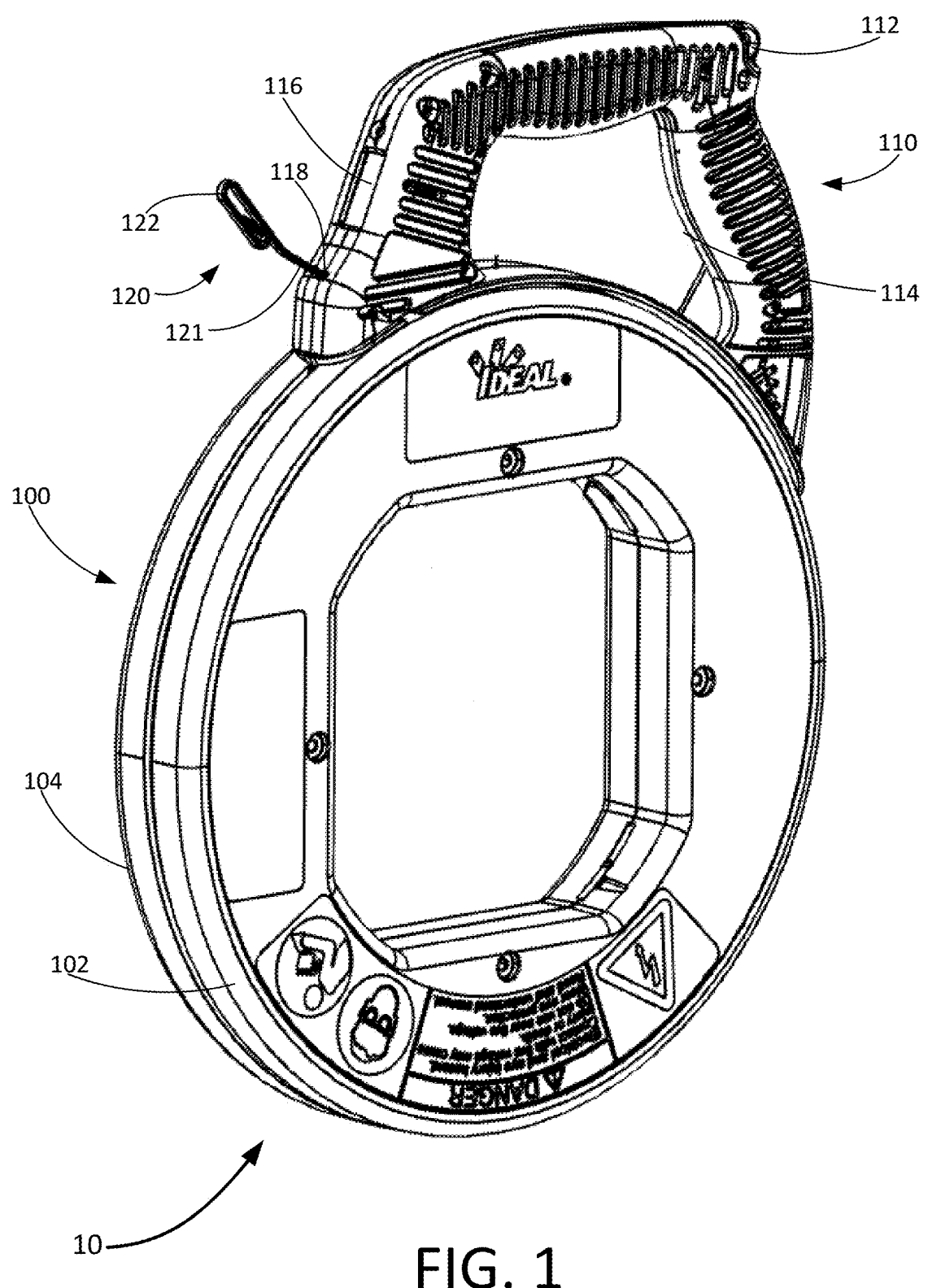
FIG. 1 is a front perspective view of an example fish tape dispenser.
Figure 2:
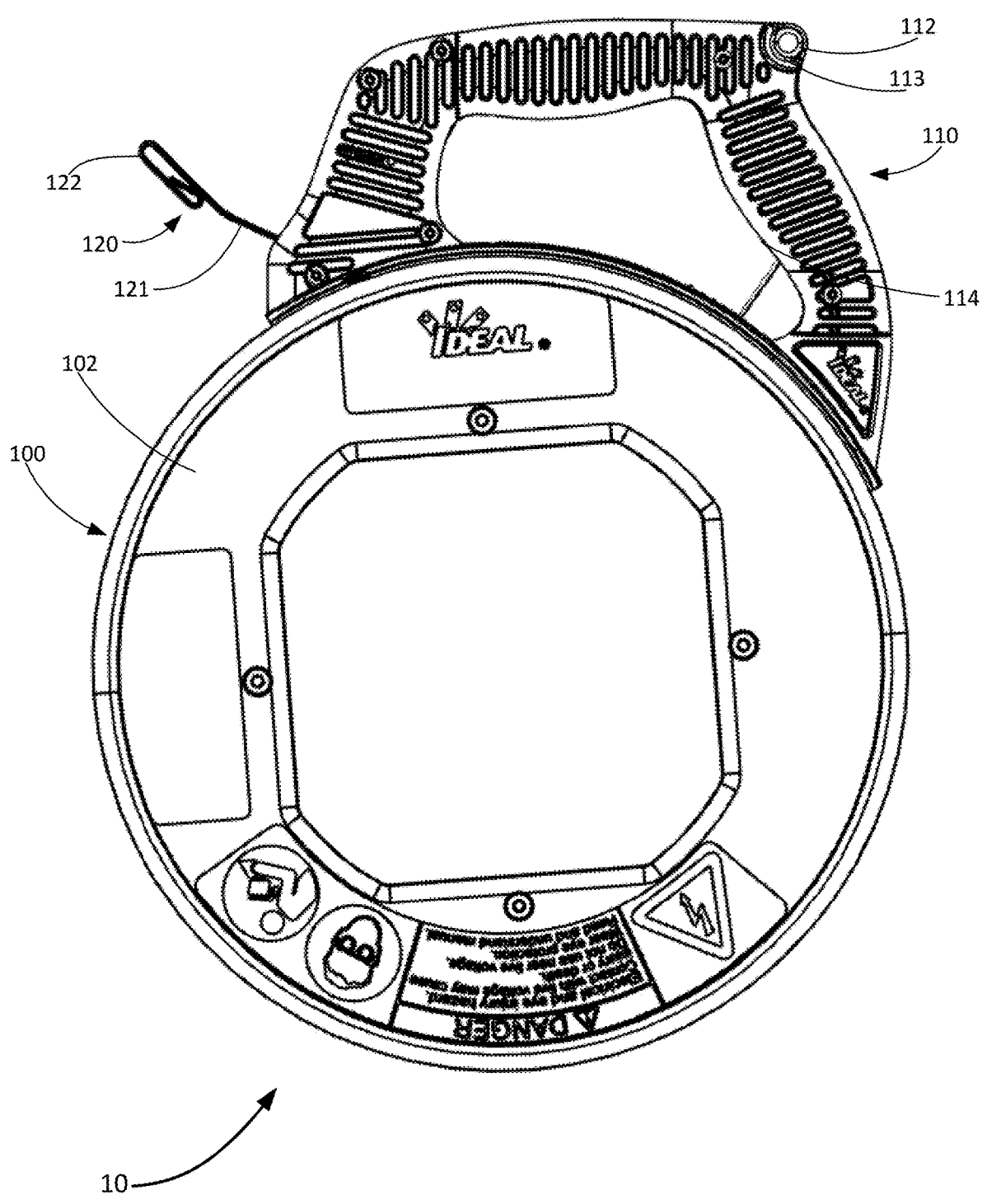
FIG. 2 is a front view of the example fish tape dispenser of FIG. 1.
Figure 3:
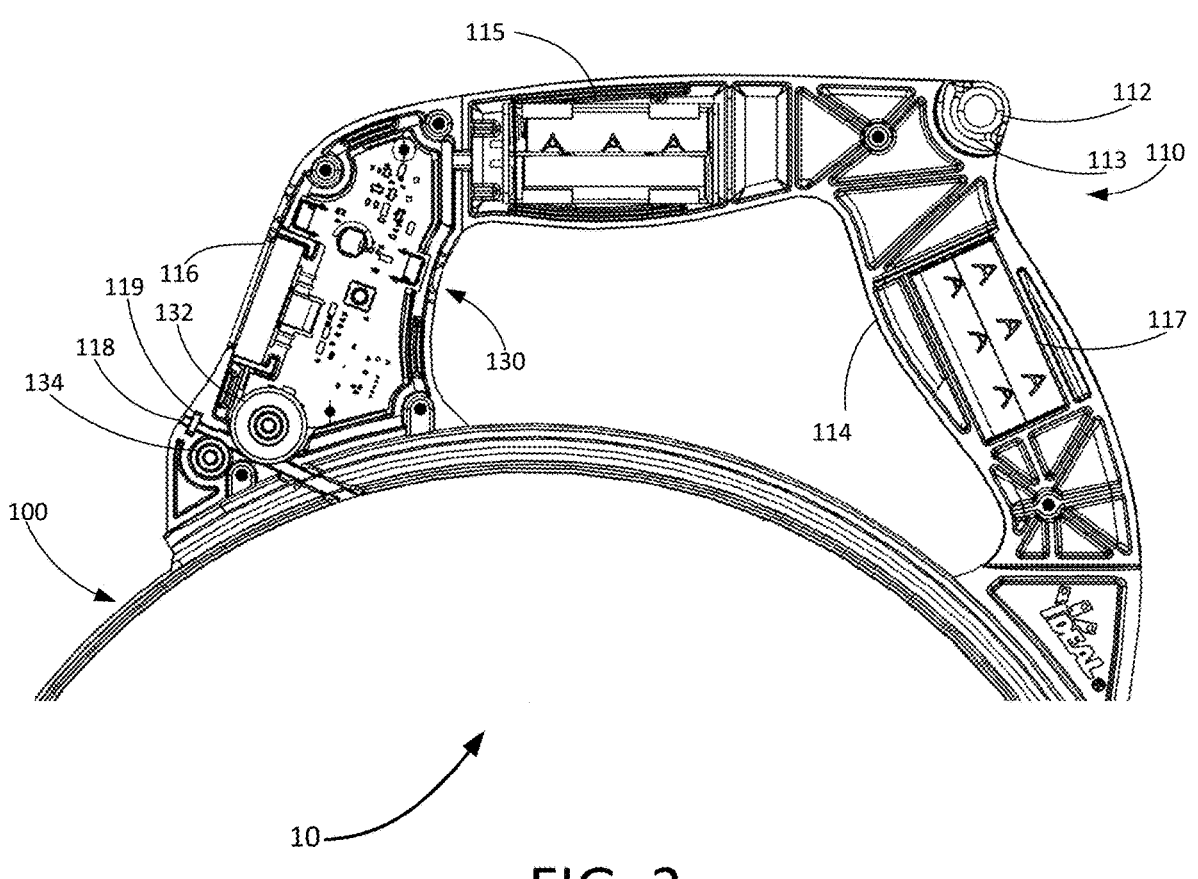
FIG. 3 is an enlarged front view of a handle of the example fish tape dispenser of FIG. 1 without a front cover.
Figure 4:
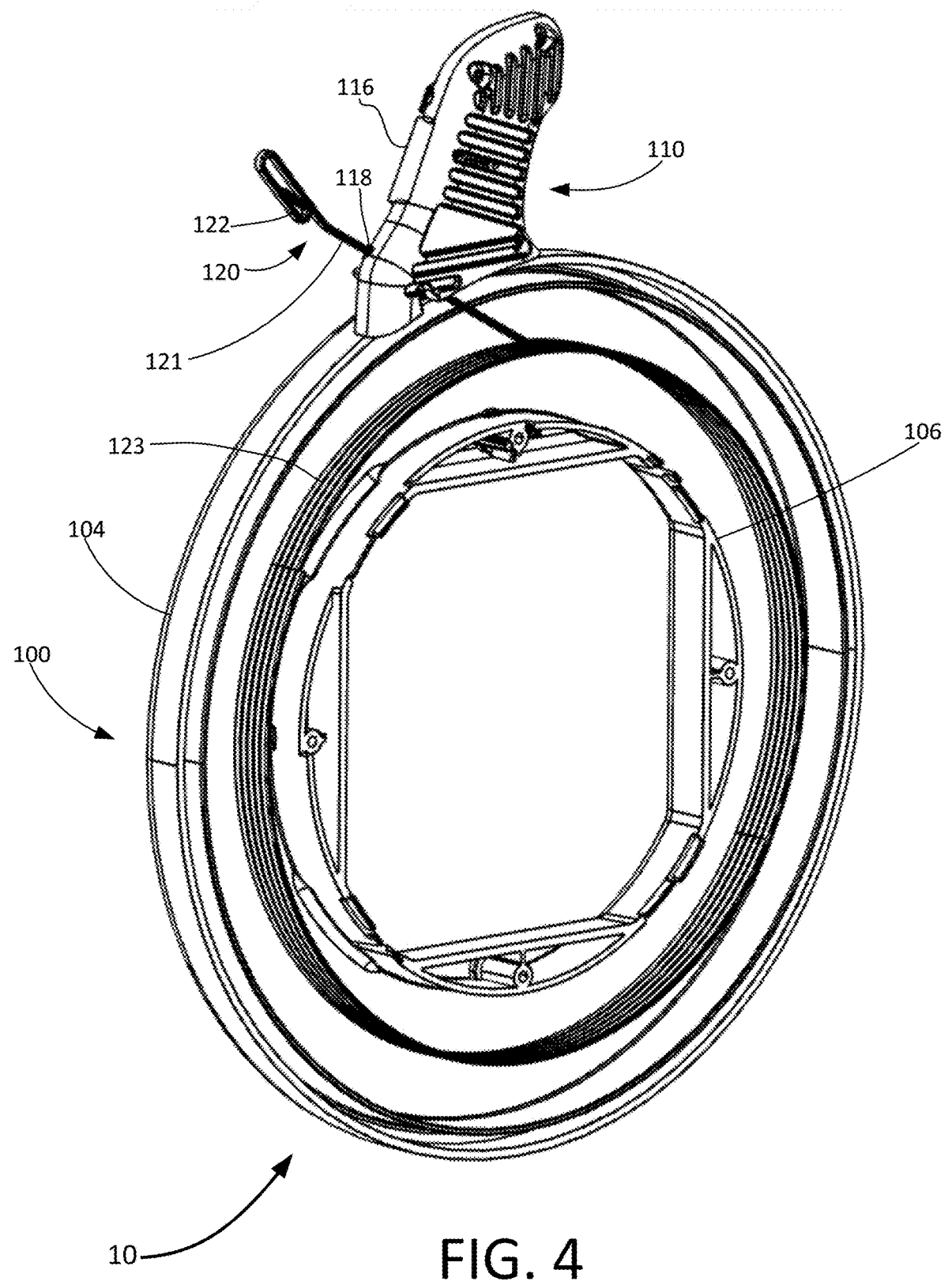
FIG. 4 is a front perspective view of the example fish tape dispenser of FIG. 1 with a front housing removed to show internal components.

A novel fish tape dispenser according to the present disclosure may enable the storage and use of fish tape while providing accurate and real-time information regarding a length of fish tape currently dispensed. As such, the fish tape dispenser described herein may provide multiple functions that may otherwise require separate dispensers, measuring tapes, etc. Furthermore, the fish tape dispenser may include a display to indicate the amount of extension, and may be capable of calibration to maintain accuracy over the life of the dispenser.

Referring now to the drawings, wherein like numerals refer to the same or similar features in the various views, FIGS. 1-9 illustrate an example fish tape dispenser 10. The dispenser 10 may include a housing 100, a handle 110, and fish tape 120. The housing 100 may include a front housing portion 102 and a rear housing portion 104 that may couple together to form the housing 100. The handle 110 may be coupled to the housing 100, and may include an attachment point 112, a grip 114, a display 116, an opening 118, a power source 115 (shown in FIG. 3), and a battery storage compartment 117.

The attachment point 112 and the grip 114 may each form a loop, with the attachment point 112 sharing a wall 113 with the grip 114 (and therefore separated from the grip 114 by wall 113), and with the grip 114 sharing a wall 113 with the housing 100. As shown, the loop formed by the grip 114 (e.g., a first loop) may be larger than the loop formed by the attachment point 112 (e.g., a second loop), such that a circumference of the first loop may be larger than a circumference of the second loop. In particular, the grip 114 may be larger in order to accommodate or receive a user's hand, while the attachment point 112 may be smaller to receive a hook, cord, tie, or other mechanism. For example, the attachment point 112 may be sized to receive a hook coupled to a peg board in order to store the dispenser 10 while not in use. As shown, the grip 114 may include a texture (e.g., set of surface indentations) to increase a coefficient of friction on the grip 114, thereby making it easier for a user to grasp the handle 110. In some embodiments, the attachment point 112 may be positioned radially outward of the grip 114 (e.g., with respect to a point about which the housing 100 rotates to dispense or retract the fish tape 120).

The fish tape 120 may include an extended portion 121, a hook 122, and a spooled portion 123. The hook 122 may be any shape or configuration suitable for use with the fish tape 120. As shown best in FIG. 6, the spooled portion 123 may be wound about a spool 106 integrally formed with the front housing 102. The fish tape 120 may be drawn from the spool 106 into the handle 110, and then out of the handle 110 via the opening 118. Accordingly, the extended portion 121 may be a length of the fish tape 120 between the hook 122 and the opening 118. The relative lengths of the extended portion 121 and the spooled portion 123 change as the fish tape 120 may be drawn from or retracted onto the spool 106. The opening 118 may include a cleaning pad 119 (shown in FIG. 5) sized to fit snugly about the fish tape 120, and configured to clean particulates and other contaminants from the fish tape 120 as the fish tape 120 may be withdrawn or returned. For example, if the fish tape 120 is used in an environment with a large amount of dirt or other foreign contaminants, the cleaning pad 119 may prevent or reduce an amount of said foreign contaminants that penetrate the housing 110.

Figure 10:
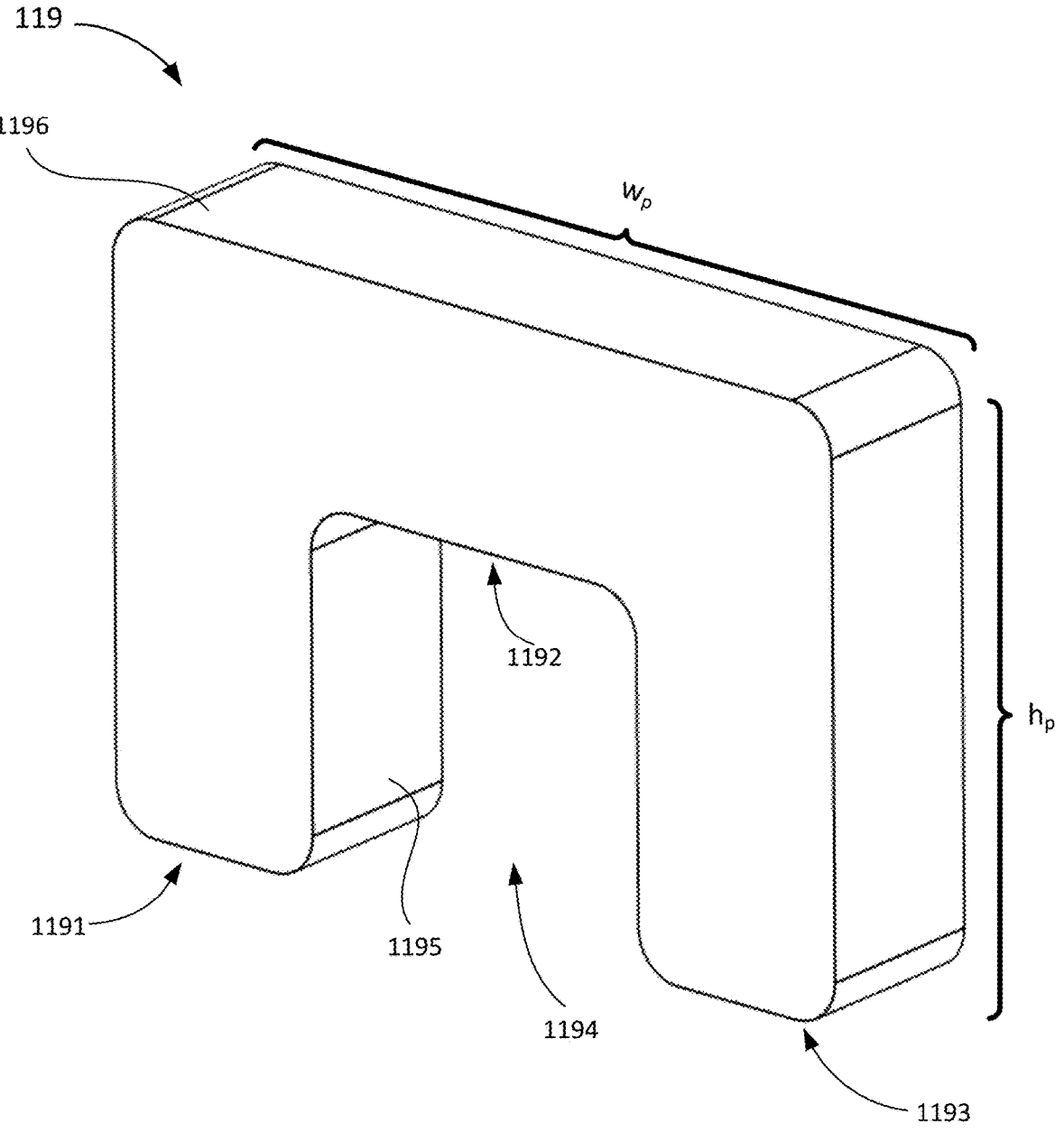
FIG. 10 is an isolated view of a cleaning pad of the example fish tape dispenser of FIG. 1.
Figure 11:
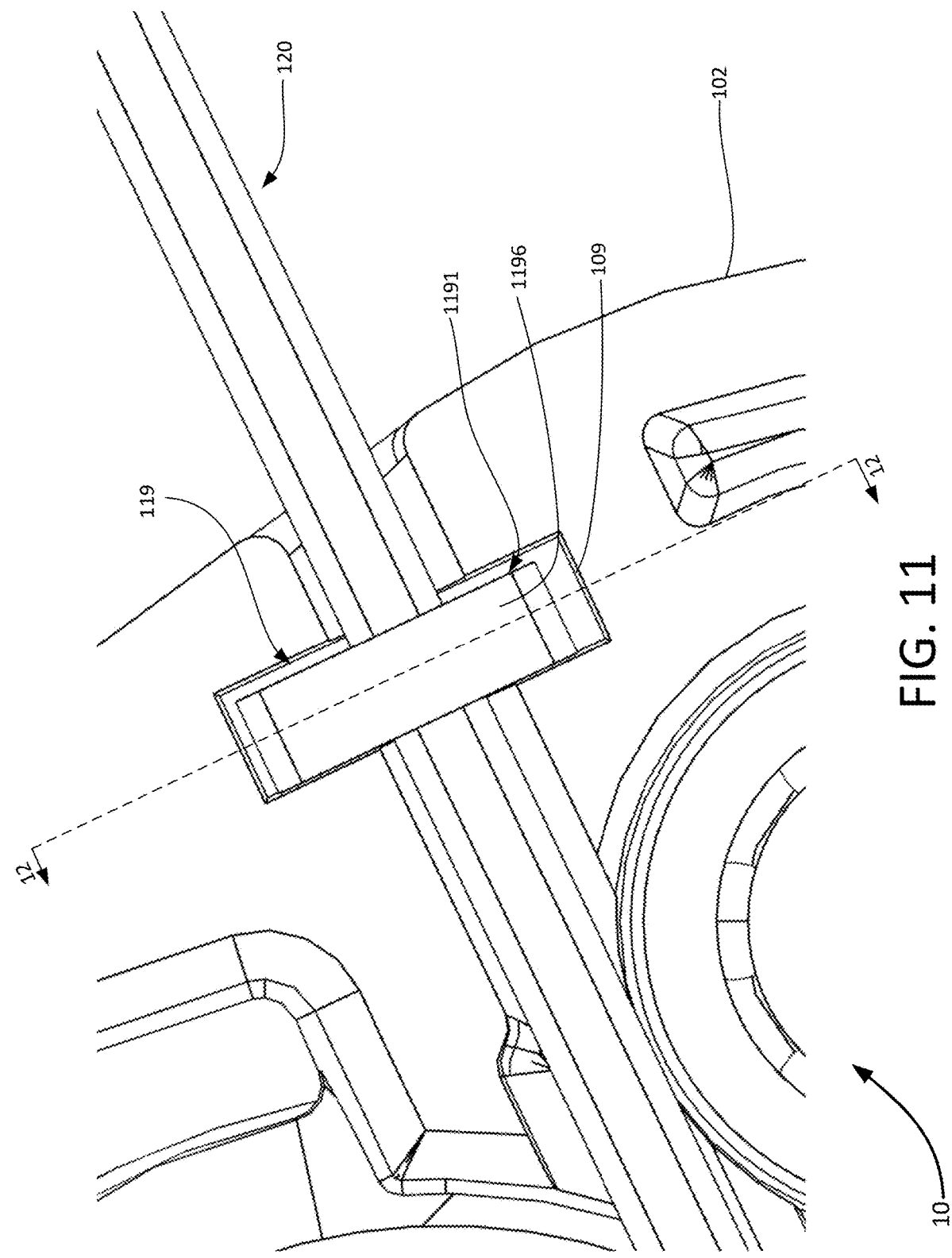
FIG. 11 is an enlarged rear view of the example fish tape dispenser of FIG. 1 with a rear housing removed to show internal components.
Figure 12:
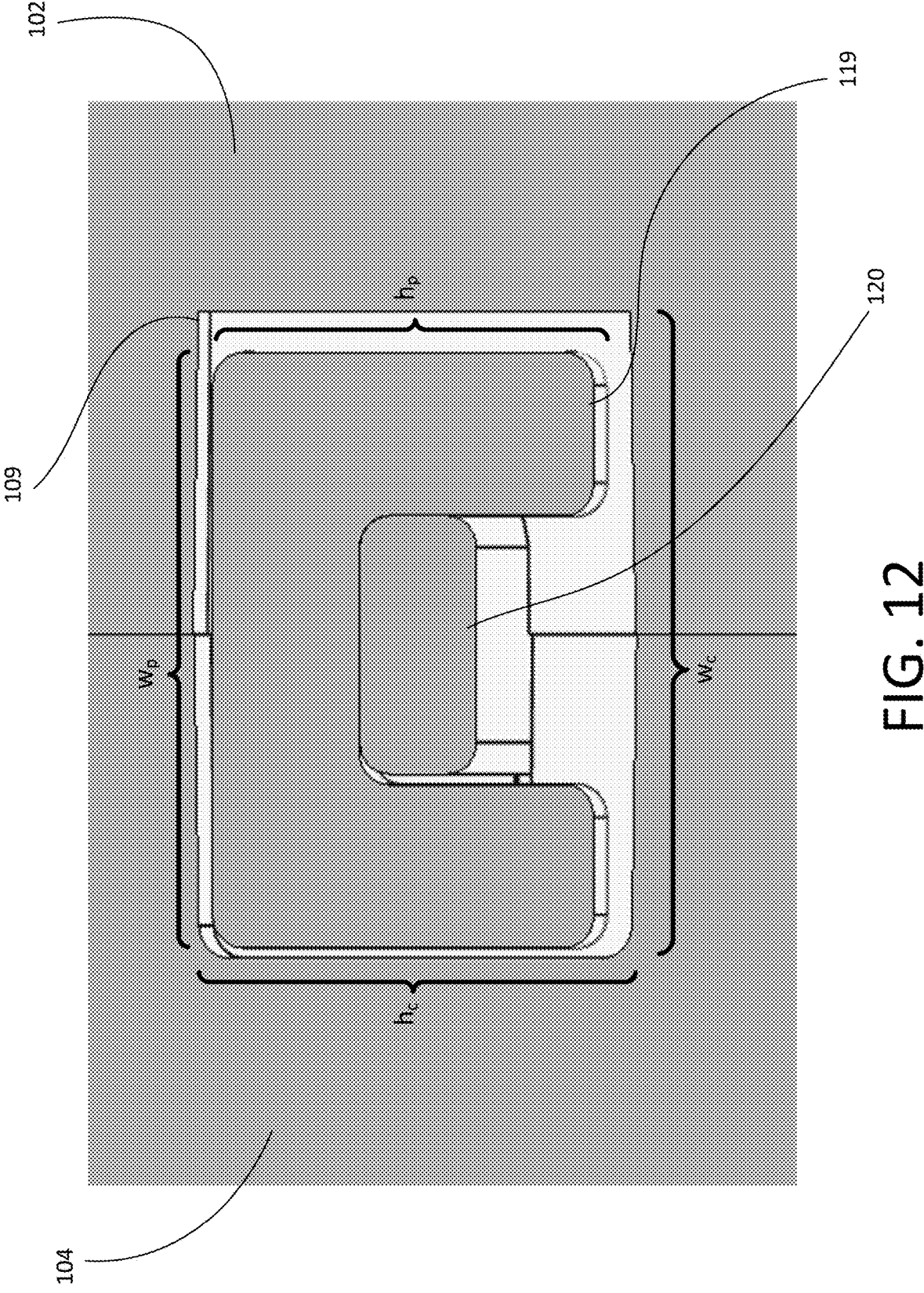
FIG. 12 is a section view of the example fish tape dispenser of FIG. 1 taken along section line 12-12 of FIG. 11.
Figure 13:
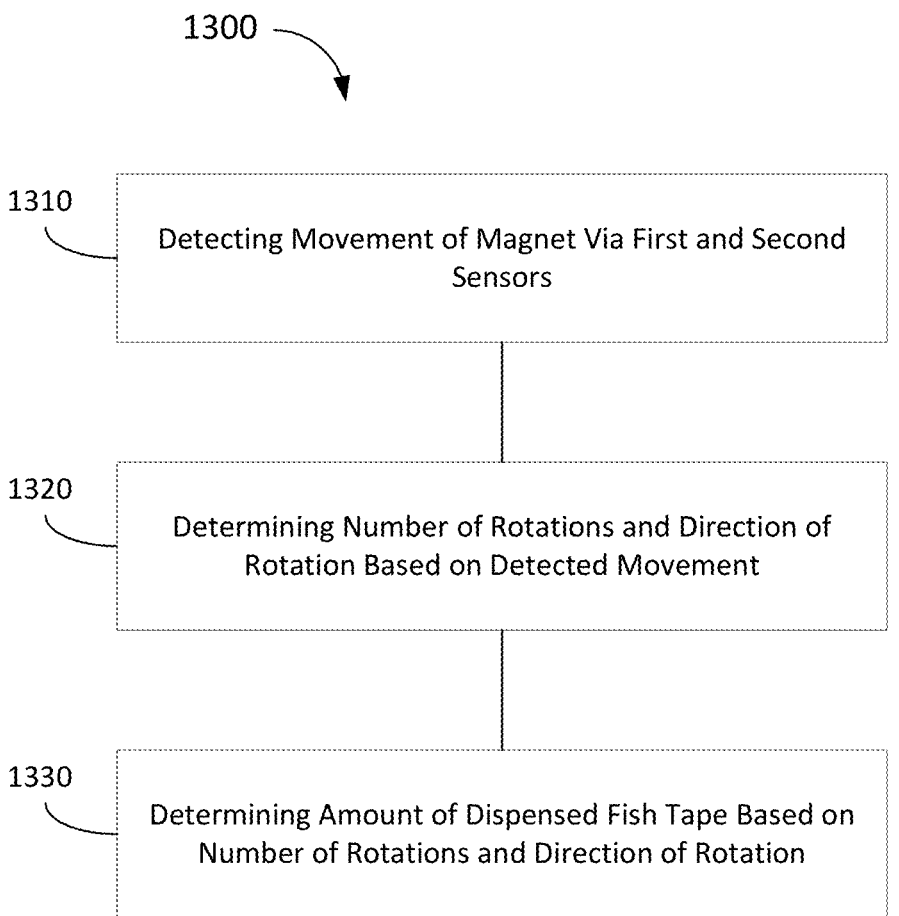
FIG. 13 is a flow chart illustrating an example method for determining an amount of fish tape dispensed by a fish tape dispenser.

FIG. 10 shows the cleaning pad 119 in isolation. The cleaning pad 119 may include a left portion 1191, a right portion 1193, and a top portion 1192 that may collectively form a pad space 1194 that may be shaped and sized to receive the fish tape 120. An inner surface 1195 of the cleaning pad 119 may be defined as the surface of the cleaning pad 119 that may come into contact with the fish tape 120 in order to clean or otherwise remove particulate matter from the fish tape 120. The inner surface 1195 may be substantially planar for each of the left portion 1191, right portion 1193, and top portion 1192. Further, the inner surface 1195 of the left portion 1191 may be substantially parallel to the inner surface 1195 of the right portion 1193 and substantially parallel to the inner surface 1195 of the top portion 1192. As a result, the inner surface 1195 may include two generally parallel, opposed walls and a wall that extends from one parallel wall to the other and is generally perpendicular to the two parallel walls. An outer surface 1196 of the cleaning pad 119 may be defined as the surface of the cleaning pad 119 that may come into contact with a cavity 109 of the housing 110 that may contain the cleaning pad 119.

In some embodiments, the cleaning pad 119 may float within the cavity 109, such that the cleaning pad 119 may be in a fixed lateral and longitudinal position relative to the fish tape 120 but may move laterally and longitudinally within the cavity 109. This is illustrated by the section view of FIG.

12, which defines a width of the cleaning pad 119 ($w_p$), a height of the cleaning pad 119 ($h_p$), a width of the cavity 109 ($w_c$), and a height of the cavity 109 ($h_c$). As shown, $w_c$ is greater than $w_p$, and $h_c$ is greater than $h_p$, such that both the height and width of the pad 119 are less than the height and width of the cavity 109 respectively.

Although the cleaning pad 119 is shown herein as being positioned about three sides of the fish tape 120 (e.g., the left portion 1191, the right portion 1193, and the top portion 1192), this disclosure should not be read as limited to a cleaning pad 119 having three sides. Instead, this disclosure should be read as including cleaning pads that may surround the fish tape 120 on all four sides (e.g., an O-shaped or looped pad, or a second top portion 1192 positioned on an opposite side of the fish tape 120), on a single side (e.g., just the top portion 1192), or on two sides of the fish tape 120 (e.g., only the top portion 1192 and a second top portion 1192 on the opposite side of the fish tape 120 but with the left portion 1191 and the right portion 1193 omitted).

Figure 7:
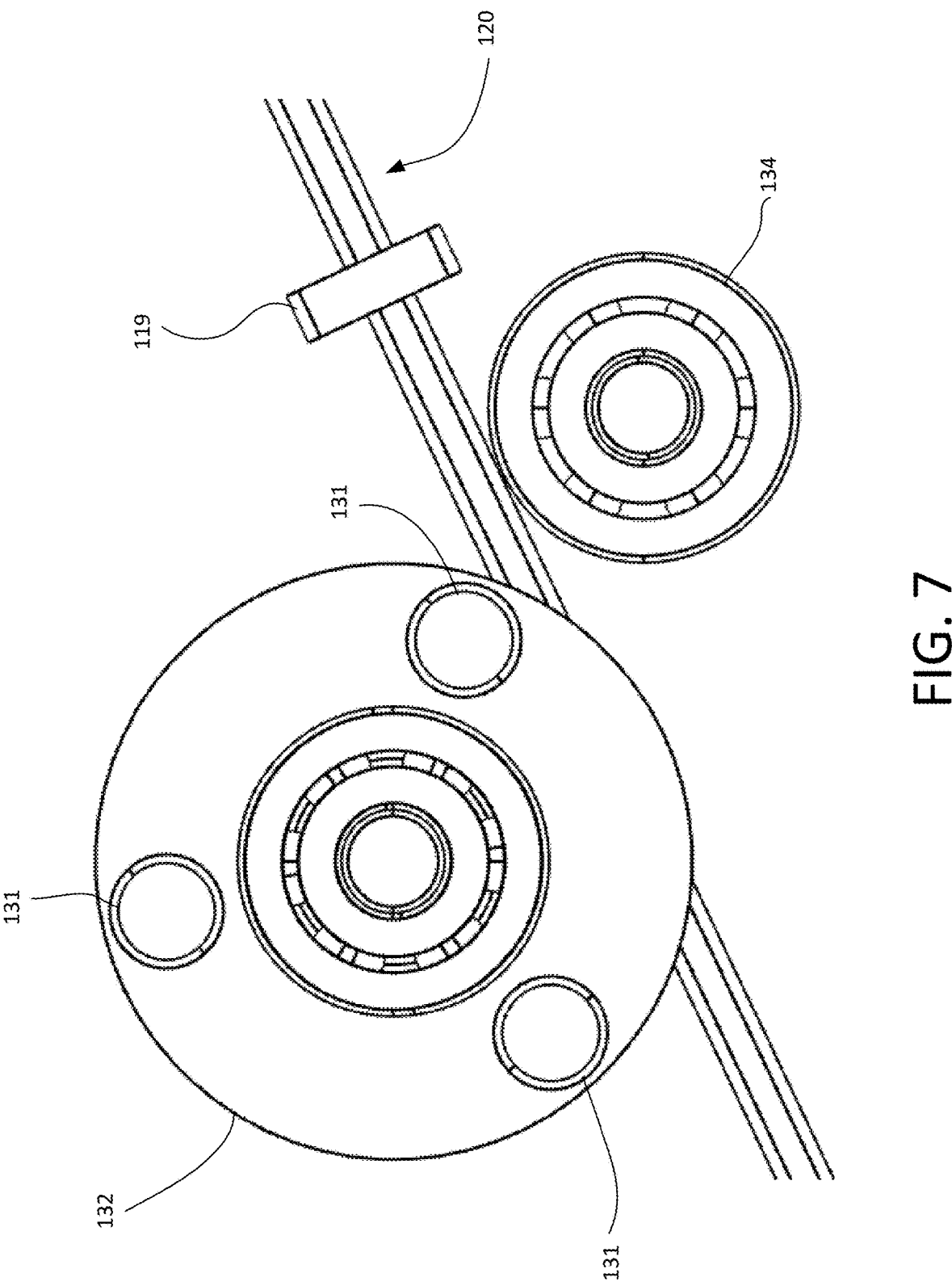
FIG. 7 is an enlarged rear view of the portion of FIG. 6 with a controller removed.
Figure 8A:
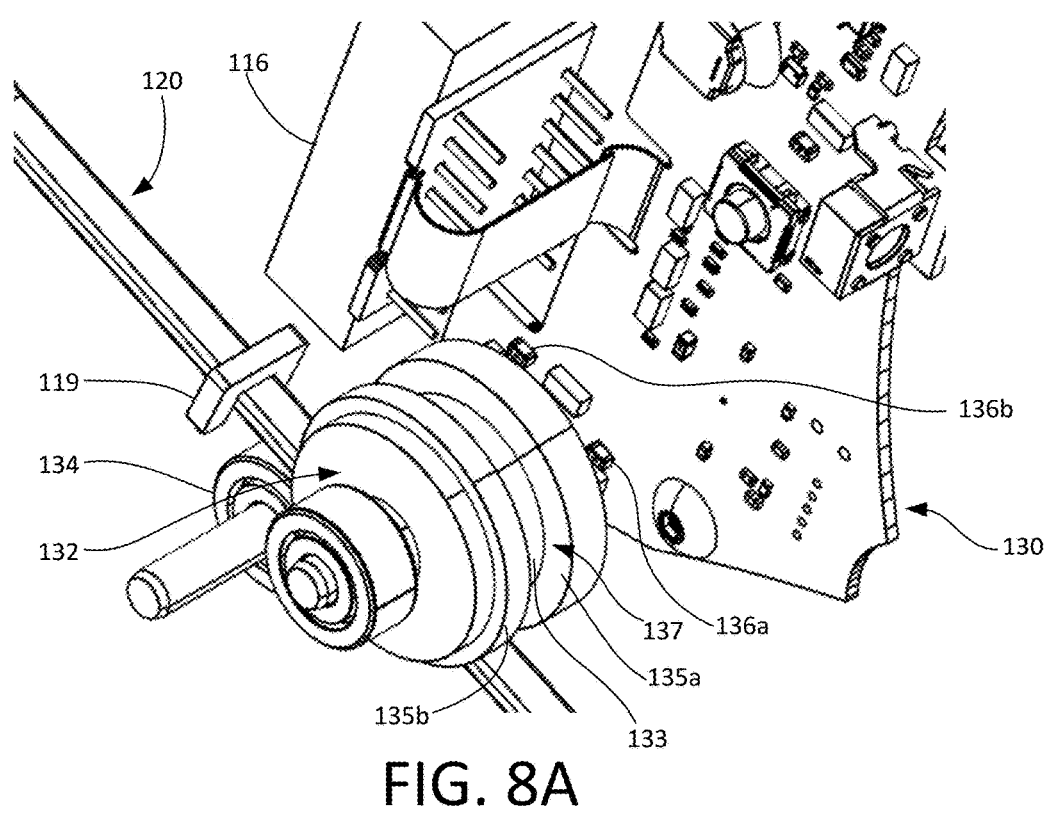
FIG. 8A is a rear perspective view of the fish tape dispenser portion of FIG. 5.
Figure 8B:
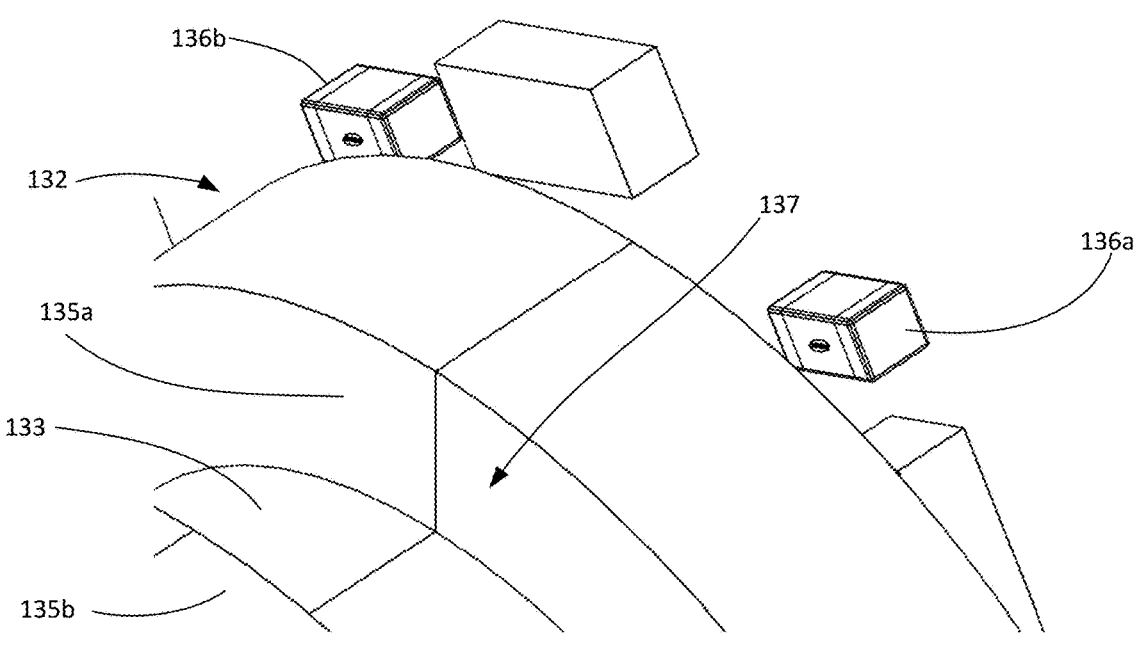
FIG. 8B is an enlarged view of a portion of the rear perspective view of FIG. 8A.
Figure 9:
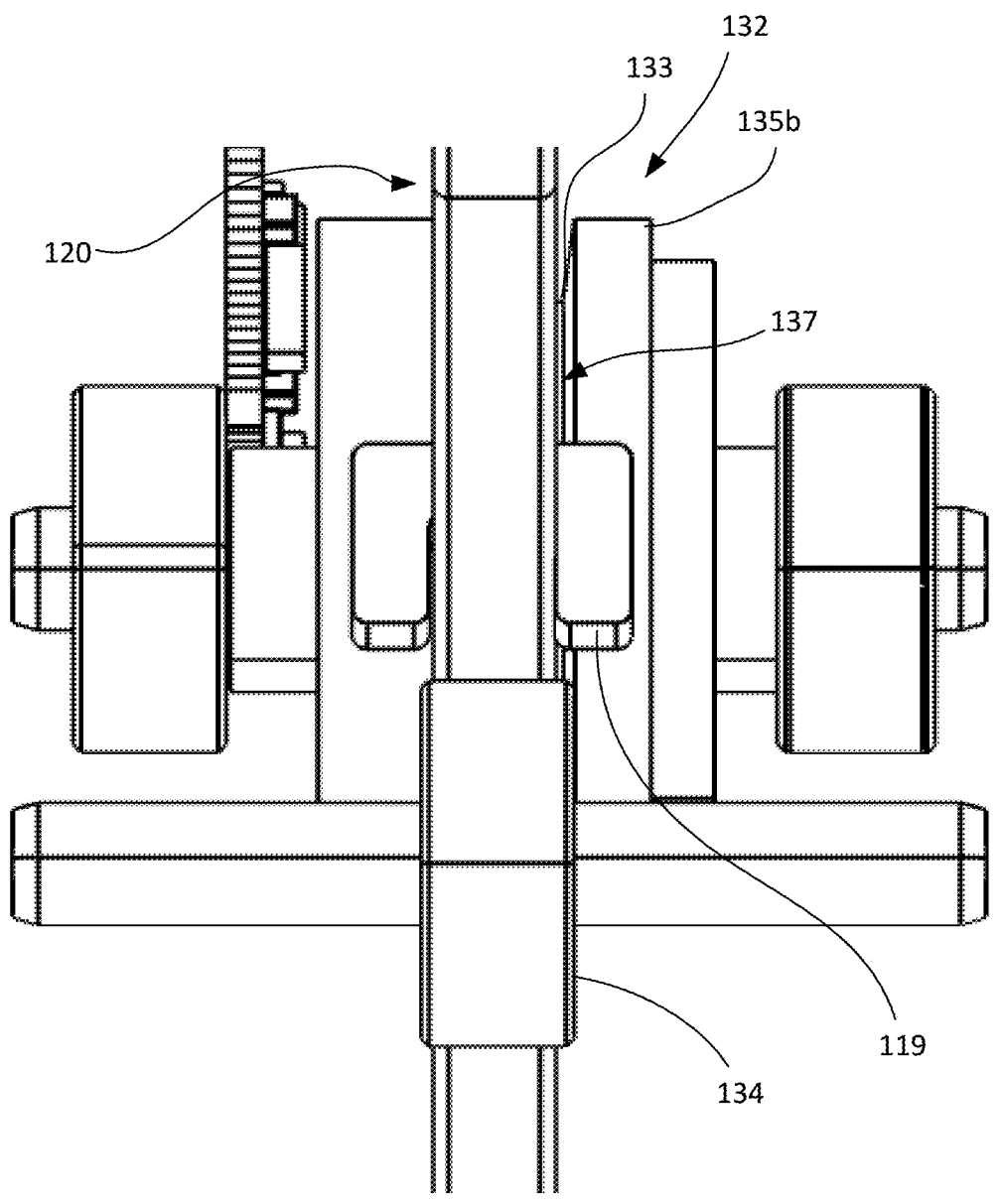
FIG. 9 is a side view of the portion of FIG. 6.

The dispenser 10 may include an encoder wheel 132 and a bearing 134 (best shown in FIG. 6) that may be contained in the handle 110 and may facilitate the drawing of the fish tape 120 from the dispenser 10. Referring to FIGS. 7-9, the encoder wheel 132 may include a slot 133, a first wall 135a, and a second wall 135b, that collectively form a space 137 to receive the fish tape 120. In particular, a width of the slot 133 (from wall 135a to wall 135b) may be substantially equal to or slightly larger than a width of the fish tape 120, such that the fish tape 120 may fit between the first wall 135a and the second wall 135b without compression or without sliding within the slot 133 independent of movement of the encoder wheel 132. The bearing 134 may have a substantially smooth surface, and may be configured to push or apply force to the fish tape 120 towards the encoder wheel 132. In particular, a first side of the fish tape 120 may be in contact with the encoder wheel 132 (and, in particular, the slot 133), and the bearing 134 may apply a force to a second (opposite) side of the fish tape 120 in order to maintain the abutment of the first side. Because a determination of a length of the extended portion 121 may be based on a rotation of the encoder wheel 132, as described at length below, the bearing 134 helps ensure that the fish tape 120 remains in constant contact with the encoder wheel 132, such that any movement of the fish tape 120 may translate to (e.g., cause via frictional engagement) rotation of the encoder wheel 132.

Figure 5:
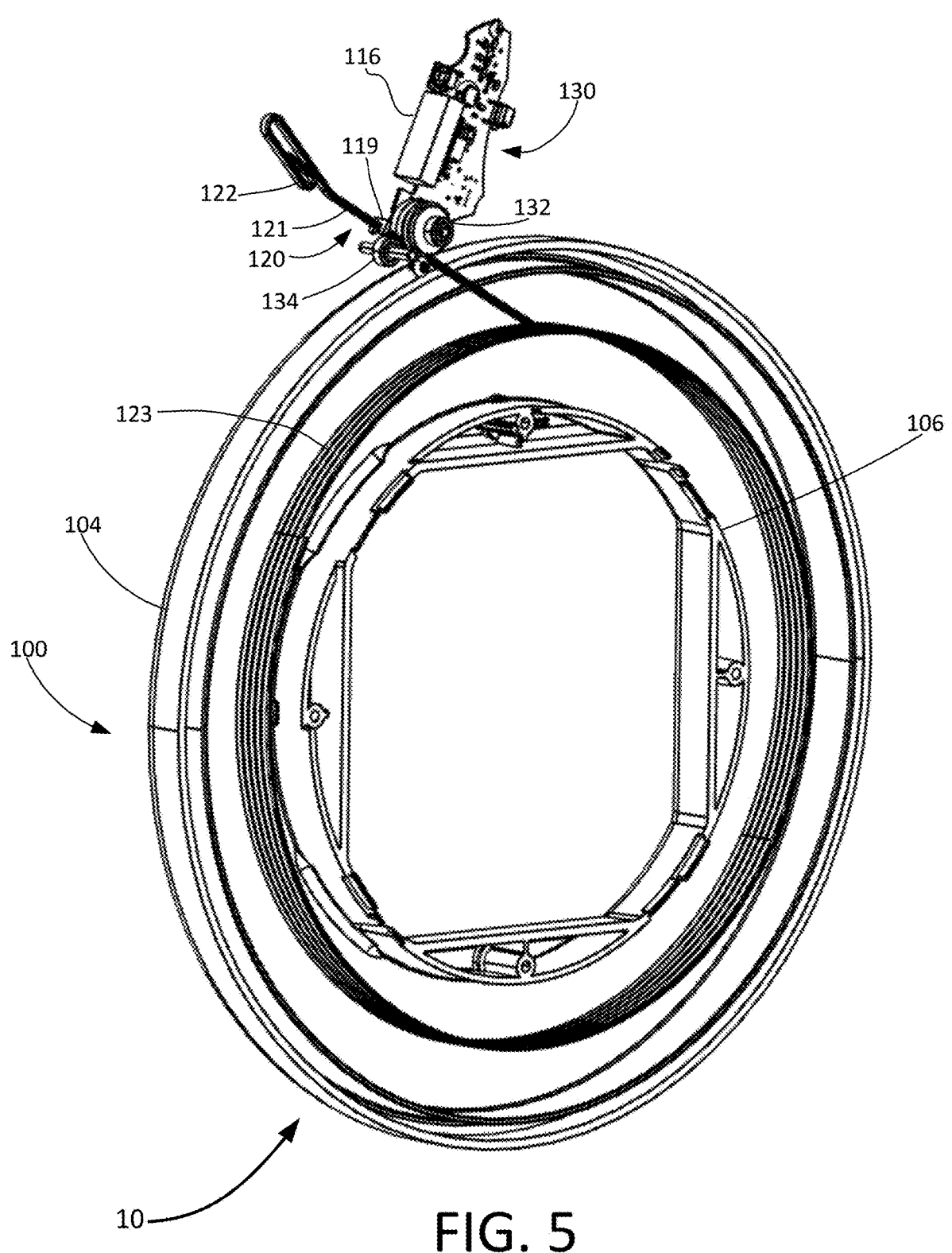
FIG. 5 is a front perspective view of the example fish tape dispenser of FIG. 1 with a front housing and handle removed to show internal components.
Figure 6:
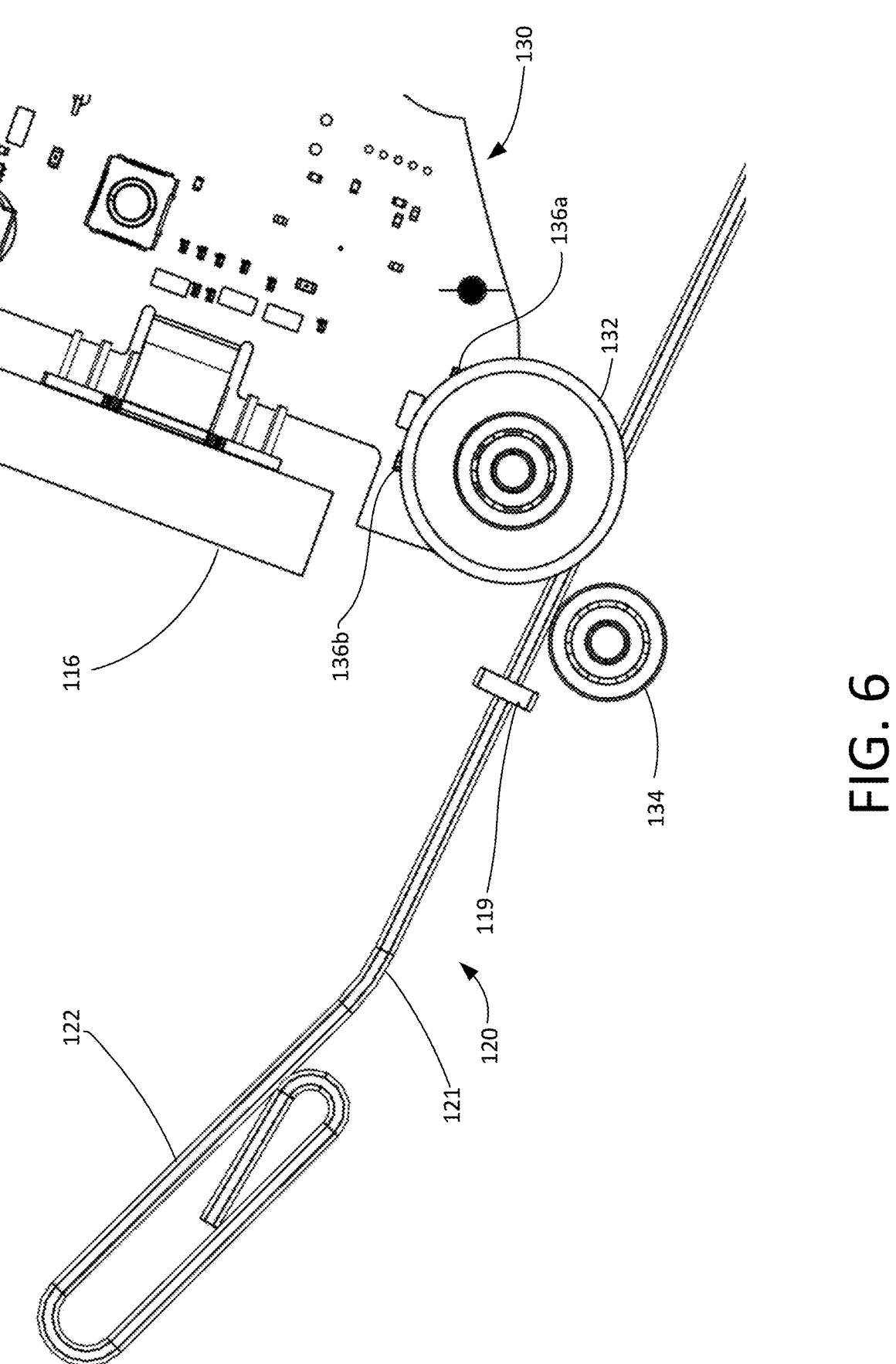
FIG. 6 is an enlarged front view of a portion of the example fish tape dispenser of FIG. 1.

Referring now to FIG. 5, in which the handle 110 may be removed for ease of illustration of interior components, the dispenser 10 may include a controller 130. The controller 130 may include a first sensor 136a and a second sensor 136b (collectively "sensors 136") and may be communicatively coupled to the display 116. The sensors 136 may be positioned radially (relative to an axis of rotation of the encoder wheel 132) to align with one or more magnets 131 of the encoder wheel 132. The sensors 136 may be configured to detect the presence of the magnets 131, and to generate a signal indicative of the detection (e.g., to output an indication that the sensor 136 detects a magnet). For example, the sensors 136 may be Hall effect sensors, which may be formed of a thin film semiconductor that receives current. The semiconductor may generate an voltage in response to a magnetic field, and a strength of the magnetic field may be determined based on the voltage. By monitoring changes in the output voltage of a sensor 136 (e.g., by the controller 130 or through the inclusion of a voltage threshold switch in connection with the sensor 136 that alternates when the voltage goes above and/or below a threshold voltage)), it can be determined when a magnet passes the sensor by finding a local peak in the output voltage. Accordingly, an indication of a magnet that may be output by the sensor may be a pattern in its output voltage, and/or a Boolean value resulting from a switch in or coupled to the sensor 136.

The controller 130 may be configured to receive the signal(s) from the sensors 136 and to determine a length of the extended portion 121 of the fish tape 120 based on the received signals. To do so, the controller 130 may utilize a signal from a single sensor, or from multiple sensors. For example, the controller may count the quantity of local peaks (or detected peaks via a switch) in the output signal from a one or more sensor(s) and divide that quantity by a number of magnets 131 on the encoder wheel 132 to determine a number of rotations of the encoder wheel 132. By multiplying the number of rotations by a known circumference of the encoder wheel 132, the controller 130 may determine a length of fish tape 120 drawn along the encoder wheel 132. The controller 130 may add or subtract (depending on a determined direction of rotation of the encoder wheel 132) this determined length from a previously-determined length of the extended portion 121, and may display the resultant amount on the display 116.

As described below, the controller 130 may determine a direction of rotation of the encoder wheel 132. If the controller 130 determines that the encoder wheel 132 may be rotating clockwise (relative to the front view of FIG. 6), the controller 130 may add the determined length to the previously-determined length, as drawing the fish tape 120 outwards (e.g., increasing the length of the extended portion 121) would cause the encoder wheel to rotate in a clockwise direction. Alternatively, if the controller 130 determines that the encoder wheel 132 may be rotating counter-clockwise (relative to the front view of FIG. 6), the controller 130 may subtract the determined length from the previously-determined length, as returning the fish tape 120 inwards (e.g., decreasing the length of the extended portion 121) would cause the encoder wheel to rotate in a counter-clockwise direction. Although reference is made herein to a clockwise rotation being associated with outward movement of the fish tape 120 and to a counter-clockwise rotation being associated with inward movement of the fish tape 120, the opposite may apply, based on a relative position of the encoder wheel 132.

The controller 130 may determine the direction of rotation of the encoder wheel 132 based on an order of and/or intervals between signals received from the first sensor 136a and from the second sensor 136b. For example, in an embodiment in which the encoder wheel 132 has a single magnet 131 but multiple sensors 136 are provided, the controller 130 may determine the direction of rotation based on comparison of the output signals from the sensors 136, and the changes in those relative signals, based on known positions of the sensors 136 relative to one another. For example, a known position of the magnet may be known to result in a known set of output signals. Where the sensors 136 are not equally circumferentially distributed, for example, a magnet positioned between two sensors 136 on their "close" side (where the magnet may be on the shorter arc between the sensors) will result in higher output signals from both sensors than when the magnet may be on the "far" side (where the magnet may be on the longer arc between the sensors). Similarly, for any combination of sensors and magnets (e.g., number and/or position), correlations between output signals and magnet positions may be known by the controller 130, and those correlations may be employed by the controller 130 to determine a direction of rotation.

In particular, because the sensors 136 may be Hall effect sensors, each sensor 136 responds to a magnetic field (e.g., from the magnet 131), and the strength of the magnetic field (and therefore of the response of the sensor 136) may be based on a distance between the sensor 136 and a center of the magnetic field (e.g., the magnet 131). However, the magnetic field formed by the magnet 131 may be larger than the magnet 131, such that the magnetic field may interact with a sensor 136 at times when the magnet 131 may not be directly in front of the sensor 136. Put differently, the sensor 136 may detect the presence of the magnetic field of the magnet 131 prior to (or after) the magnet 131 is positioned in front of the sensor 136. Accordingly, in an embodiment in which multiple sensors 136 may be included, the magnetic field from the magnet 131 may be detected by multiple sensors 136 at the same time. These periods of time may be referred to as "overlap." By monitoring which sensor 136 triggers alone before and/or after the "overlap" period, the controller 130 may determine direction of rotation. Alternatively, the "overlap" period may be defined by none of the sensors 136 detecting a magnetic field, with the controller 130 determining direction of rotation based on the sensors 136 triggering alone before and/or after.

In an example in which the encoder wheel 132 has multiple magnets 131, the controller 130 may determine the direction of rotation of the encoder wheel 132 based on an origin of a first received signal. In particular, if the first signal received by the controller 130 may be from the first sensor 136a and a second signal may be received from the second sensor 136b, the controller 130 may determine that the direction of rotation may be counter-clockwise, given that a magnet 131 travelling counter-clockwise would first interact with the first sensor 136a and then with the second sensor 136b. Alternatively, if the first signal may be received from the second sensor 136b and the second signal may be received from the first sensor 136a, the controller 130 may determine the direction of rotation as clockwise.

In some embodiments, the magnets 131 may be arranged within the encoder wheel 132 such that the magnetic field of each magnet 131 may be substantially parallel to the rotation of the encoder wheel 132. In these embodiments, the sensors 136 may be configured to react with and differentiate between each of the two polarities (e.g., provides a first signal in response to the first polarity and a second signal in response to the second polarity), which may enable the controller 130 to determine a direction of rotation with a single magnet 131 (or any number of magnets). For example, if the controller 130 stores an indication of the orientation of the polarities on the single magnet 131 (e.g., a first polarity on a relative left of the magnet 131 and a second polarity on a relative right of the magnet 131), the controller 130 may determine the direction of rotation of the encoder wheel 132 based on an order of signals received from the sensors 136.

Although the controller 130 may be shown to include two sensors 136, any number of sensors 136 may be included on the controller 130, such that this disclosure should not be read as limited to an arrangement of two sensors 136. Similarly, although the encoder wheel 132 may be shown to include three magnets 131 (see FIG. 7), any number of magnets 131 may be included on the encoder wheel 132, such that this disclosure should not be read as limited to an arrangement of three magnets 131.

Positions of the magnets 131 and of the sensors 136 may be defined by relation to an axis of rotation of the encoder wheel 132 and an arc perpendicular to that axis. For example, in the embodiment shown herein, the first sensor 136a and second sensor 136b may be separated by an angle of 90° relative to the axis of rotation (e.g., along the arc), and each magnet 131 may be separated from another magnet 131 by an angle of 120° relative to the axis of rotation. In other embodiments, the first sensor 136a and the second sensor 136b may be separated by any angle between (and inclusive of) 60-120°. In embodiments in which there are multiple magnets 131 (e.g., the shown embodiment), each magnet 131 may be evenly spaced about the encoder wheel 132. For example, if two magnets 131 are included on the encoder wheel 132, each magnet may be 180° from the other, or if four magnets are included on the encoder wheel 132, each magnet may be 90° from each other. The dispenser 10 may include any number of sensors 136 or magnets 131, so long as the sensors 136 and magnets 131 are not in equally spaced intervals around the axis of rotation (e.g., the relative angle between each sensor 136 is not equal to the relative angle between each magnet 131). More of either sensor 136 and/or magnet 131 may result in increased accuracy of the dispenser 10. Additional sensors 136 may increase the positional accuracy of the magnets 131, so long as the angle between each of the magnets 131 remains greater than the total arc angle of sensors 136, so that 2 or more magnets 131 are not being detected at the same time. More magnets 131 could be used to increase a number of detections per encoder wheel 132 rotation, which could enable a more accurate reading of the number of encoder wheel 132 rotations (e.g., because the controller 130 may utilize the additional detections to identify more discrete intervals of rotation), so long as the angle between the magnets 131 remains greater than the total arc angle of sensors 136, as discussed above. Any number of magnets 131 may be used so long as the angle between the magnets 131 remains greater than the total arc angle of sensors 136. Any number of sensors 136 may be used so long as the total arc angle of sensors 136 remains less than the angle between magnets 131.

The controller 130 may provide a calibration procedure for the controller 130 itself to account for, among other things, wear on the encoder wheel 132, slipping of the fish tape 120 on the encoder wheel, stretching of the fish tape 120 over continuous use, etc. The calibration procedure may begin with the extended portion 121 having a length of substantially zero (e.g., the fish tape 120 may be fully retracted into the housing 100). To initiate the calibration procedure, a button may be pressed on the handle 110. In response to the button press, the controller 130 may set a current value of the extended portion 121 length at zero. Once initiated, the fish tape 120 may be withdrawn until the extended portion 121 reaches a length equal to a pre-determined value (e.g., 10 feet or 120 inches). This pre-determined value may be displayed by the controller 130 on the display 116. As the fish tape 120 may be withdrawn, the controller 130 may count a number of rotations of the encoder wheel 132 (e.g., by counting a number of sensor 133 indications). Once the extended portion 121 length may be equal to the pre-determined value (e.g., by comparison to an external measurement source, like a measuring tape), a second button press indicates to the controller 130 that the length of the extended portion 121 may be equal to the pre-determined value. The controller 130 then divides that pre-determined value by a detected number of rotations, and stores the resultant quotient as an effective (or functional) circumference of the encoder wheel 132.

FIG. 10 may be a flow chart illustrating an example method 1300 for determining an amount of dispensed fish tape. The method 1300, or one or more portions of the method 1300, may include use of the fish tape dispenser 13 (e.g. drawing fish tape 120 from the dispenser 13) and particularly the controller 130, in some embodiments.

The method 1300 may include, at block 1310, detecting movement of a magnet (e.g., magnet 131) via a first sensor (e.g., first sensor 136*a*) and a second sensor (e.g., second sensor 136*b*). The magnet may be part of (e.g., attached to, inserted within, etc.) a wheel (e.g., encoder wheel 132) that facilitates drawing of the fish tape, such that withdrawing (or returning) fish tape to the dispenser causes the wheel to rotate and, thereby, the magnet to move. In those embodiments in which multiple magnets are included on the wheel, the method 1300 includes, at block 1310, detecting movements of the multiple magnets.

The method 1300 may also include, at block 1320, determining a number of magnetic interactions, rotations, and/or a direction of rotation based on the detected movement of the magnet. The number of magnetic interactions may be determined as a number of total indications with all sensors (e.g., first sensor 136*a* and second sensor 136*b*), or as a number of indications with a single sensor. As described above, the number of rotations may be determined by counting a number of indications from the first and second sensors, and dividing by the number of magnets on the wheel. The direction of rotation may be determined based on an order of signals from the sensors. For example, in an embodiment in which the wheel has a single magnet, but multiple sensors are provided, the controller may determine the direction of rotation based on comparison of the output signals from the sensors, and the changes in those relative signals, based on known positions of the sensors relative to one another. For example, a known position of the magnet may be known to result in a known set of output signals. Where the sensors are not equally circumferentially distributed, for example, a magnet positioned between two sensors on their "close" side (where the magnet may be on the shorter arc between the sensors) will result in higher output signals from both sensors than when the magnet may be on the "far" side (where the magnet may be on the longer arc between the sensors).

The method 1300 may further include, at block 1330, determining an amount of dispensed fish tape based on the number of magnetic interactions or rotations, and the direction of rotation. The controller may multiply the number of magnetic interactions (if of a single sensor) or the number rotations by a stored value indicative of the circumference of the wheel to determine the length of fish tape. If the number of magnetic interactions are a total of all sensors, the controller may multiply the number of magnetic interactions by a stored value indicative of a functional circumference of the encoder wheel 132, which may be a distance between the two sensors. From there, the controller may add or subtract the determined length to or from a previously-determined amount based on the direction of rotation.

The dispenser 10 of the present disclosure provides many advantages over known fish tape dispensers. First, the dispenser 10 may be configured to provide real-time data regarding an amount of fish tape 120 currently withdrawn from the dispenser 10, which may reduce the number of tools or steps needed, as a user would not need to separately utilize a measuring tape device once the fish tape 120 may be positioned. Second, the inclusion of a cleaning pad 119 within the housing 110 further increases the functionality offered by the single dispenser 10, as the cleaning pad 120 improves the durability of not only the fish tape 120 but also the dispenser 10 as a whole. For example, the cleaning pad 119 can prevent dirt or dust from the environment from entering the housing 110 and degrading the spool 106, encoder wheel 132, or any other internal component.

In some embodiments, a device may include a spool; a fish tape wound on the spool; a magnet positioned to move as the fish tape may be withdrawn from the spool; a sensor configured to detect the magnet and to generate a signal indicative of the detection; and a controller in communication with the sensor and configured to determine an extension of the fish tape based on the signal; and output the determined amount.

In some of these embodiments, the device may further include a handle coupled to the spool, the handle including an opening configured to dispense the fish tape from the spool. In some of these embodiments, the handle may include a primary loop and a secondary loop, a circumference of the primary loop may be larger than a circumference of the secondary loop, and the secondary loop shares a wall with the primary loop. In some of these embodiments, the opening may include a pad to clean the fish tape as the fish tape may be dispensed from the opening.

In some of these embodiments, the fish tape may include a first side and a second side, the spool receives the first side of the fish tape, and the device further may include a bearing positioned to receive the second side of the fish tape and configured to apply pressure to the fish tape towards the spool.

In some of these embodiments, the spool may include a tape track having a slot and a first wall and second wall on opposite sides of the slot, the slot having a width substantially equal to a width of the fish tape.

In some of these embodiments, the sensor may be a first sensor and the signal may be a first signal; the device further may include a second sensor configured to detect the magnet and to generate a second signal indicative of the detection by the second sensor; and the controller may be configured to determine a direction of rotation of the spool based on the first signal and the second signal. In some of these embodiments, the first sensor may be displaced from the second sensor by between 60 and 120 degrees relative to a point defined by a center of the spool.

In some of these embodiments, the determination of the amount of the length may include retrieving a stored value indicative of a functional circumference of the spool, and multiplying the number of rotations by the stored value. In some of these embodiments, the stored value may be determined by: drawing a pre-determined amount of the length from the spool; receiving the number of rotations from the sensor; and dividing the pre-determined amount by the number of rotations.

In some of these embodiments, the device further may include a display, and wherein the controller outputs the determined amount on the display.

In some embodiments, a method for dispensing fish tape from a spool may include detecting movement of a magnet via a first sensor and a second sensor, the magnet coupled to a wheel configured to facilitate the fish tape from the spool; determining, by a controller, a number of rotations and a direction of rotation based on the detected movement; and determining, by the controller, an amount of dispensed fish tape based on the number of rotations and the direction of rotation.

In some of these embodiments, determining of the number of rotations may include receiving a first indication from the first sensor, the first indication in response to the first sensor detecting the magnet; receiving a second indication from the second sensor, the second indication in response to the second sensor detecting the magnet; receiving a third indication from the first sensor, the third indication in response to the first sensor detecting the magnet; and in response to the third indication following the second indication, counting the number of rotations as the first indication and the third indication.

In some of these embodiments, the determination of the amount of dispensed fish tape may include retrieving a stored value indicative of a functional circumference of the wheel, and multiplying the number of rotations by the stored value. In some of these embodiments, the method may further include calibrating the controller by: drawing a pre-determined length of fish tape from the spool; receiving the number of rotations from the first sensor or second sensor; and setting the stored value based on the pre-determined length and the received number of rotations.

In some embodiments, a fish tape device may include a housing; a spool disposed within the housing; a fish tape wound on the spool; an encoder wheel coupled to the fish tape so as to rotate in response to extension of the fish tape; a magnet disposed on the encoder wheel; a sensor disposed proximate the encoder wheel and configured to detect the magnet and generate a signal indicative of detection of the magnet; and a controller configured to receive the signal and to determine an amount of extension of the fish tape according to the signal.

In some of these embodiments, the housing further may include an opening configured to dispense the fish tape from the spool, the opening including a pad to clean the fish tape as the fish tape may be dispensed from the opening.

In some of these embodiments, the fish tape may include a first side and a second side, the encoder wheel receives the first side of the fish tape, and the housing further may include a bearing positioned to receive the second side of the fish tape and configured to apply pressure to the fish tape towards the encoder wheel.

In some of these embodiments, the sensor may be a first sensor and the signal may be a first signal; the device further may include a second sensor configured to detect the magnet and to generate a second signal indicative of the detection by the second sensor; and the controller may be configured to determine a direction of rotation of the encoder wheel based on the first signal and the second signal.

In some of these embodiments, the determination of the amount of the extension may include drawing a pre-determined amount of the length from the spool; receiving the number of rotations from the sensor; determining a functional circumference of the encoder wheel by dividing the pre-determined amount by the number of rotations; and multiplying the number of rotations by the functional circumference.

While this disclosure has described certain embodiments, it will be understood that the claims are not intended to be limited to these embodiments except as explicitly recited in the claims. On the contrary, the instant disclosure may be intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

What may be claimed is:

1. A device, comprising:
a spool;
a fish tape wound on the spool and configured to be withdrawn from the spool;
a magnet positioned to move as the fish tape is withdrawn from the spool;
a sensor configured to detect the magnet and to generate a signal indicative of the detection;
a pad having a generally U-shape with a top portion, a left portion, and a right portion, the pad being configured to clean the fish tape as the fish tape may be dispensed from the opening; and
a controller in communication with the sensor and configured to:
determine an extension of the fish tape based on the signal; and
output the determined amount.

2. The device of claim 1, further comprising:
a handle coupled to the spool, the handle comprising an opening configured to dispense the fish tape from the spool.

3. The device of claim 2, wherein:
the handle comprises a primary loop and a secondary loop,
a circumference of the primary loop is larger than a circumference of the secondary loop, and
the secondary loop shares a wall with the primary loop.

4. The device of claim 2, wherein the pad is disposed proximate the opening.

5. The device of claim 4, wherein the pad is shaped to float within the opening and in a substantially fixed position relative to the fish tape and perpendicular to a direction of extension of the fish tape.

6. The device of claim 1, wherein:
the fish tape comprises a first side and a second side,
the spool receives the first side of the fish tape, and
the device further comprises a bearing positioned to receive the second side of the fish tape and configured to apply pressure to the fish tape towards the spool.

7. The device of claim 1, wherein an encoder wheel includes a slot and a first wall and a second wall on opposite sides of the slot, the slot having a width substantially equal to a width of the fish tape.

8. The device of claim 1, wherein:
the sensor is a first sensor and the signal is a first signal;
the device further comprises a second sensor configured to detect the magnet and to generate a second signal indicative of the detection by the second sensor; and
the controller is configured to determine a direction of rotation of the spool based on the first signal and the second signal.

9. The device of claim 8, wherein the first sensor is displaced from the second sensor by between 60 and 120 degrees relative to a point defined by a center of the spool.

10. The device of claim 1, wherein the determination of the amount of the length comprises:
retrieving a stored value indicative of a functional circumference of the spool, and
multiplying the number of rotations by the stored value.

11. The device of claim 10, wherein the stored value is determined by:
drawing a pre-determined amount of the length from the spool;

US 12,565,398 B2

11

12 receiving the number of rotations from the sensor; and
dividing the pre-determined amount by the number of
rotations.

12. The device of claim 1, wherein the device further
comprises a display, and wherein the controller outputs the
determined amount on the display.

\* \* \* \* \*